United States Patent [19]
Asogawa

[11] Patent Number: 5,396,565
[45] Date of Patent: Mar. 7, 1995

[54] PATTERN RECOGNITION NEURAL NET INSENSITIVE TO DISTURBANCES IN INPUTS

[75] Inventor: Minoru Asogawa, Tokyo, Japan

[73] Assignee: NEC Corporation, Tokyo, Japan

[21] Appl. No.: 971,253

[22] Filed: Nov. 4, 1992

Related U.S. Application Data

[63] Continuation of Ser. No. 709,826, Jun. 4, 1991, abandoned.

[30] Foreign Application Priority Data

Jun. 4, 1990 [JP] Japan .................. 2-144414

[51] Int. Cl.$^6$ ............................. G06K 9/62
[52] U.S. Cl. ........................ 382/14; 382/15; 395/21; 395/23
[58] Field of Search ............... 382/14, 15; 364/513, 364/807; 395/20, 21, 22, 23, 24; G06G 7/00; G06K 9/62

[56] References Cited

U.S. PATENT DOCUMENTS

| | | | |
|---|---|---|---|
| 3,950,733 | 4/1976 | Cooper et al. | 382/15 |
| 4,760,604 | 7/1988 | Cooper et al. | 382/15 |
| 4,805,225 | 2/1989 | Clark | 382/15 |
| 4,914,708 | 4/1990 | Carpenter | 382/14 |
| 4,941,122 | 7/1990 | Weideman | 364/513 |
| 4,975,961 | 12/1990 | Sakoe | 381/43 |
| 5,003,490 | 3/1991 | Castelaz et al. | 382/15 |
| 5,058,180 | 10/1991 | Ichan | 382/36 |
| 5,142,590 | 8/1992 | Carpenter | 382/14 |

OTHER PUBLICATIONS

D. E. Rumelhart, et al., "Learning Representations by Back-Propagating Errors", Nature, vol. 323, Oct., 1986, pp. 533-536.
D. E. Rumelhart, et al., "Explorations in the Microstructure of Cognition" Parallel Distributed Processing, vol. 1, (MIT Press) 1986, pp. 319-362.
Terrence J. Sejnowski et al., "Parallel Networks that Learn to Pronounce English Text", *Complex Systems* 1 (1987) 145-168.
Gail A. Cerpenter et al "The Art of Adaptive Pattern Recognition by a Self-Organizing Neural Network", IEEE Computer, pp. 77-88, Mar., 1988.

*Primary Examiner*—Yon J. Couso
*Attorney, Agent, or Firm*—Foley & Lardner

[57] ABSTRACT

In a neural network assembly for use in pattern recognition, a memory region memorizes reference patterns along with their categories. A pattern associator neural network is connected to the memory region and is trained in accordance with a back-propagation training algorithm in a training phase of operation to correctly recognize the reference patterns according to the categories. An adaptive input region is connected to the neural network, supplied with roughly segmented patterns as input patterns, and trained in a recognition phase of operation following the training phase. and correctly processes the input patterns into processed patterns which the neural network can correctly recognize according to the categories. Preferably, the assembly is operable in the training phase as comprising the memory region, the neural network, and a controlling part which is connected to the memory region and the neural network to train the neural network. In the recognition phase the assembly is operable as comprising the input region, the neural network and the controlling part which is now connected to the input region and the neural network and adjusts the input region so that each roughly segmented pattern may approach a pertinent one of the reference patterns.

4 Claims, 4 Drawing Sheets

PATTERN RECOGNITION NEURAL NET INSENSITIVE TO DISTURBANCES IN INPUTS

This application is a continuation of application Ser. No. 07/709.826, filed Jun. 4, 1991, now abandoned.

BACKGROUND OF THE INVENTION

This invention relates to a neural network or net which is trainable to correctly recognize input patterns subjected to disturbances, such as translation and rotation.

Various pattern recognition devices are already in commercial use. As a result of recent research and development, neural networks are used in pattern recognition. For example, such neural networks are disclosed in U.S. Pat. No. 4,975,961 issued to Hiroaki Sakoe and assigned to the present assignee and in U.S. patent application Ser. No. 596,613 filed Oct. 10, 1990 non abandoned, by Hiroaki Sakoe and assigned to the present assignee as a continuation-in-part application based on Japanese Patent Application No. 298,282 of 1987.

In general, a pattern recognition device comprises a category memory for storing categories into which reference patterns are classified. An adaptive input unit preprocesses or adaptively processes input patterns subjected to disturbances into processed patterns. While preprocessing the input patterns, the input unit removes the disturbances from the input patterns to provide rectified patterns as the processed patterns. A recognition unit is connected to the category memory and the input unit for using the processed patterns in recognizing the input patterns as belonging to at least one of the categories by extracting characteristic features from the processed patterns and in producing a recognition result representative of such at least one of the categories.

In the above-referenced Sakoe patent and patent application, the neural network is of the type of a pattern associator neural network described in a book by E. D. Rumelhart and others, "Parallel Distributed Processing" Volume I (MIT Press, 1986), and is trainable or capable of learning in accordance with an algorithm which is known in the art as a back-propagation training algorithm or simply as back propagation art and is disclosed revealed in an article contributed by E. D. Rumelhart and two others to Nature, Volume 323, pages 533 to 536 (Oct. 9, 1986), under the title of "Learning Representation by Back-Propagating Errors". In addition to the pattern associator neural network, a pattern recognition device must comprise several other units and is therefore referred to herein as a neural network assembly. It is more appropriate in such a neural network assembly to refer to the memory as a memory region, the adaptive input unit as an adaptive input region, and the recognition unit as a recognition region.

When using the neural network assembly in correctly and precisely recognizing input patterns subjected to disturbances, the adapitive input region will produce most appropriately processed patterns. It is, however, very difficult to preliminarily determine The manner of removing the disturbances and of extracting the characteristic features in connection with all possible input patterns.

SUMMARY OF THE INVENTION

It is therefore an object of the present invention to provide a neural network assembly which is adapted to pattern recognition and is insensitive to disturbances in input patterns, such as noise, translation, rotation, and scale change.

It is another object of this invention to provide a neural network assembly Which is of the type described and is operable as an adaptive pattern recognition device.

It is still another object of this invention to provide a neural network assembly which is of the type described and is trainable or capable of learning to correctly and precisely recognize the input patterns.

It is a further object of this invention to provide a neural network assembly which is of the type described and which includes an adaptive input region which is trainable to remove disturbances in input patterns.

Other objects of this invention will become clear as the description proceeds.

According to this invention, there is provided a neural network assembly which comprises (A) a memory region for storing reference patterns and categories of the reference patterns; (B) an adaptive input region for adaptively processing input patterns into processed patterns (C) a pattern associator neural network connected to the memory region and the input region for recognizing the processed patterns to produce a recognition result representative of at least one of thee categories: and (D) a training and recognition controlling part connected to the memory region, the input region, and the pattern associator neural network for training the pattern associator neural network so as to make the pattern associator neural network correctly produce the recognition result.

DESCRIPTION OF THE PREFERRED EMBODIMENT

Figure 1:
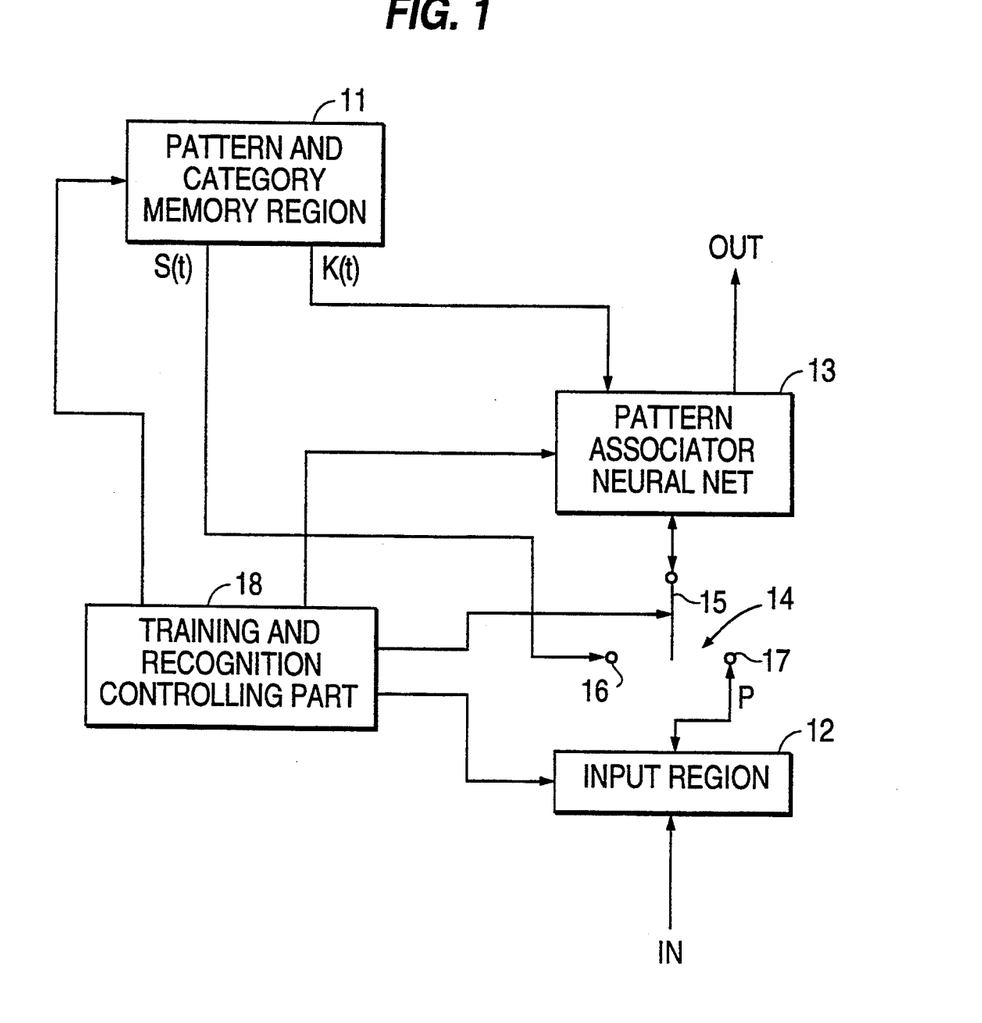
FIG. 1 is a block diagram of a neural network assembly according to an embodiment of the instant invention.

Referring to FIG. 1, attention will be directed to a neural network assembly according to a preferred embodiment of the present invention. The neural network assembly is operable as an adaptive pattern recognition device and comprises a pattern and category memory region 11 for storing a first plurality M of reference patterns $S(t)$ and a second plurality N of categories $K(t)$ into which the reference patterns are classified. It should be noted in this connection that signals representative of the reference patterns and the categories are herein referred to simply as the reference patterns and the categories merely for brevity of the description and that similar expressions will be used in connection with like signals.

As a numerical example, the second plurality N is equal to twenty-nine according to an article contributed by T. J. Sejnowski and another to Complex Systems, Volume 1 (1981), pages 145 to 168, under the title of "Parallel Networks that Learn to pronounce English Text". This number is used for recognizing pronunciation of English words to represent twenty-six letters of the alphabet, one punctuation mark, and two kinds of separation in words. The first plurality M is usually greater than the second plurality N. This is because two or more reference patterns, such as "zero" and "naught", may be classified into a single category.

An adaptive input region 12 is composed of a predetermined number of neural cells in a manner which will become clear as the description proceeds. The neural cells will be called region cells. At any rate, the input region 12 is supplied with input patterns IN which are usually subjected to disturbances, such as noise, translation, rotation, and scale change, which are different from standard patterns which are put in standard positions and orientations without noise and can be correctly and precisely recognized by the neural network assembly. In order to obtain an approach to the standard patterns, the input region 12 preprocesses or adaptively processes the input patterns into processed patterns P. Incidentally, the neural cells are alternatively called nodes, neuron units, computation elements, or the like.

More particularly, the adaptive input region 12 is supplied with the input patterns IN as an input pattern sequence, roughly segments the input pattern sequence into segmented patterns in the manner known in the art, and subjects the segmented patterns to translation, rotation, and scale change as will become clear in the following. In this manner, the input region 12 removes the disturbances from the input patterns to produce rectified patterns as the processed patterns P. The input region 12 may additionally carry out time axis warping in the manner described in the above-referenced Sakoe patent when the input patterns are representative of, typically, continuously spoken words. Merely for simplicity of the description, it will be presumed throughout the following that the input patterns IN are the segmented patterns.

A pattern associator neural network 13 is controllably connected to the pattern and category memory region 11 and the adaptive input region 12. A little more in detail, the network 13 is connected to the memory region 11 through a direct connection and through a switching part 14 and to the input region 12 through the switching part 14. Being depicted as a mechanically or manually operable switch merely for convenience of illustration, the switching part 14 comprises a movable contact 15 connected to the network 13, a first fixed contact 16 connected to the memory region 11, and a second fixed contact 17 connected to the input region 12. The network 13 will be later described more in detail.

A training and recognition controlling part 18 is connected to the pattern and category memory region 11, the adaptive input region 12, the pattern associator neural network 13, and the switching part 14. The controlling part 18 is for specifying a training phase of operation of the network 13 and a recognition phase of operation of the neural network assembly with the training phase followed by the recognition phase. Other functions of the controlling part 18 will later be described.

In the training phase of operation of the pattern associator neural network 13, the training and recognition controlling part 18 switches the movable contact 15 to the first fixed contact 16. The network 13 is supplied from the pattern and category memory region 11 with the categories K(t) through the direct connection and with the reference patterns S(t) through the switching part 14. In the meantime, the controlling part 18 may keep the adaptive input region 12 out of operation.

In the recognition phase of operation of the neural network assembly, the training and recognition controlling part 18 switches the movable contact 15 to the second fixed contact 17. The controlling part 18 makes the pattern associator neural network exchange the processed patterns P with the adaptive input region 12. Meanwhile, the controlling part 18 may keep supply of the categories K(t) to the network 13 through the direct connection.

Figure 2:
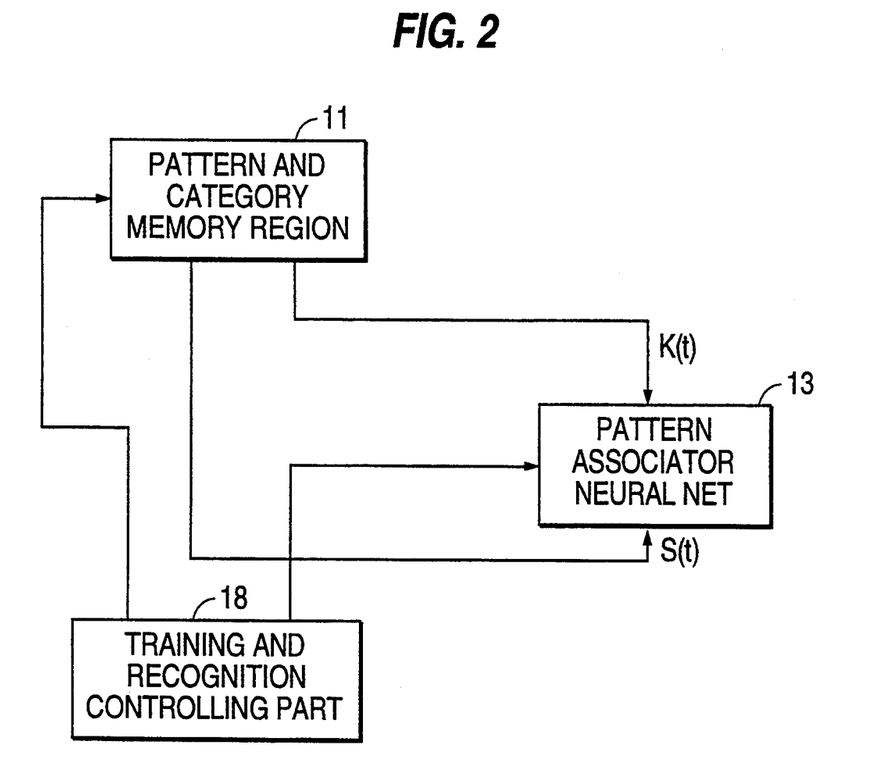
FIG. 2 is a block diagram of the neural network assembly which is illustrated in FIG. 1 and is in a training phase of operation.
Figure 3:
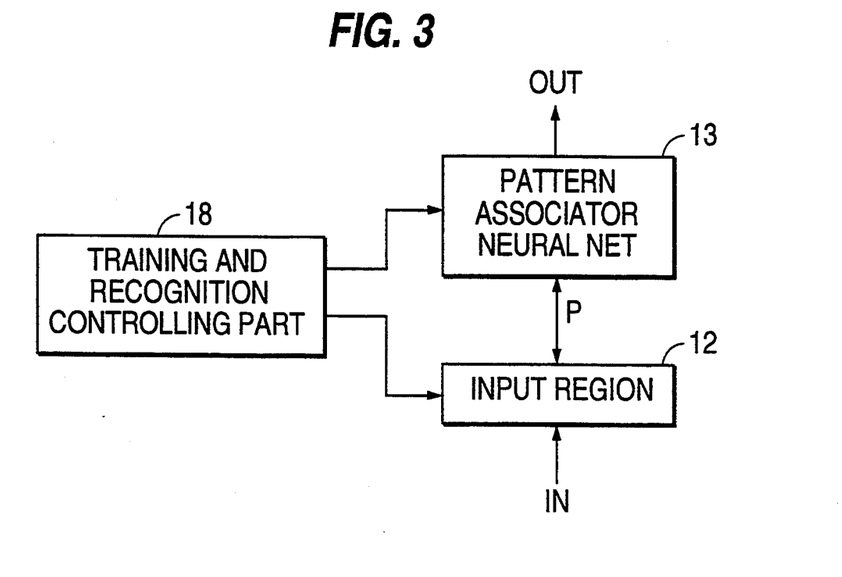
FIG. 3 is a block diagram of the neural network assembly which is depicted in FIG. 1 and is in a recognition phase of operation.

FIGS. 2 and 3 will be referred to. In the training phase of operation of the pattern associator neural network 13, the neural network assembly comprises the pattern and category memory region 11, the pattern associator neural network 13 supplied with the categories K(t) through the direct connection and with the reference patterns S(t) through the switching part 14, and the traininn and recognition controlling part 18 connected to the memory region 11 and the network 13 and, throughout the training and the recognition phases of operation, to the adaptive input region 12. In the recognition phase of operation in,which the neural network assembly is operable following the training phase of operation, the neural network assembly comprises the adaptive input region 12, the pattern associator neural network 13 exchanging the processed patterns P with the input region 12, and the training and recognition controlling part 18 connected to the input region 12 and the network 13 and, throughout the training and recognition phases, to the pattern and category memory region 11.

It will be described in detail in the following that, during the training phase of operation, the training and recognition controlling part 18 trains the pattern associator neural network 13 by using the categories K(t) as training signals and the reference patterns S(t) as learning signals. At the end of the training phase, the network 13 produces a recognition result OUT representative of one of the categories K(t) at a time that comprises the time that the reference pattern or patterns S(t) are supplied thereto through the switching part 14. During the recognition phase of operation, the controlling part 18 adjusts the adaptive input region 12 so as to make the recognition result OUT represent at least one of the categories K(t) that comprises the reference pattern or patterns S(t) having a greatest possible likelihood or similarity relative to the processed patterns P. Adjustment of the input region 12 may alternatively be called training of the input region 12.

Figure 4:
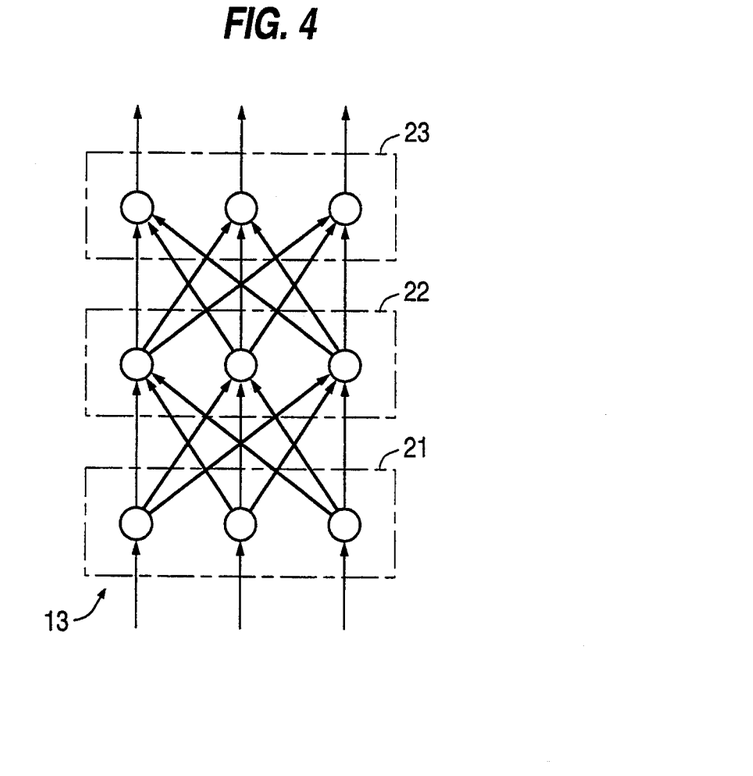
FIG. 4 is a schematic representation of a pattern associator neural network which is used in the neural network assembly shown in FIG. 1.

Turning to FIG. 4, the pattern associator neural network 13 comprises an input layer 21 comprising a first number of neural input cells which are symbolically depicted by small circles and are not interconnected to one another. An intermediate layer 22 comprising a second number of neural intermediate cells which are not interconnected but are connected to the input cells through input to intermediate connections. An output layer 23 comprising a third number of neural output cells which are not interconnected but are connected to the intermediate cells through intermediate to output connections.

In the manner which will presently be described in more detail, the input cells produce input-layer output signal components when supplied with input-layer input signal components collectively representative of each of the reference patterns S(t) in the training phase of operation and each of the processed patterns P in the recognition phase of operation. Supplied with the input-layer output signal components as intermediate-layer input signal components through the input to intermediate connections, the intermediate cells produce intermediate-layer output signal components. Supplied with the intermediate-layer output signal components through the intermediate to output connections as output-layer input signal components, the output cells produce output-layer output signal components collectively representative of the above-mentioned recognition result OUT. In this manner, the input to intermediate and the intermediate to output connections are for forward propagating the input-layer and the intermediate-layer output signal components.

In the pattern associator neural network 13, the third number may be equal to only one when one category alone is used in the neural network assembly and is stored in the pattern and category memory region 11. In the numerical example described before, the first number is typically equal to two hundred and three. The second number is equal to about eighty. The third number is equal to twenty-six, which number is determined in consideration of twenty-one phoneme symbols and five other symbols for use as accent marks and for use in segmenting pronunciation. In the example being illustrated, the third number is equal to the second plurality N so as to establish one-to-one correspondence between the categories K(t) and the output cells. The network 13 may comprise two or more intermediate layers in the manner known in the art.

The input cells will be numbered in a certain predetermined order from 1 up to the first number and the output cells, from 1 to the third number. Attention will be directed to an i-th output cell and to a j-th input cell, where i is variable between 1 and the third number, both inclusive, and j is variable between 1 and the first number, both inclusive. It will be presumed that the j-th input cell is supplied with an input-layer j-th input signal component net(j).

In the known manner, each of the input the intermediate, and the output cells are assigned with a weight w. An output signal component is produced by such a cell of one of the input, the intermediate, and the output layers 21 to 23 to be equal to a transform into which an overall output signal of either the input or the intermediate layer is transformed by a nonlinear function, such as a sigmoid function, where the overall output signal is given by a total sum of those output signal components which are produced by the cells in the input or the intermediate layer and each of which is equal to a product of its input signal component and the weight.

In this manner, the output signal component of the i-th output cell depends on the weights assigned to the i-th output cell and to the input and the intermediate cells. The afore-mentioned back-propagation training algorithm is effective in training the weights w of the respective input, intermediate, and output cells. After completion of the training phase of operation, supply of each of the reference patterns S(t) will result in production of a correct and precise output signal component with a maximum level from a correct and precise cell among the output cells that is assigned to a correct and precise category comprising the reference pattern under consideration. In the meantime, the characteristic features are most appropriately extracted from the reference patterns S(t).

On starting the training phase of operation, arbitrary values may be given to the weights w in the manner known in the art. During the training phase, the reference patterns S(t) are successively supplied from the pattern and category memory region 11 to the pattern associator neural network 13 through the switching part 14 together with the categories K(t) which are supplied through the direct connection and comprise the reference patterns S(t). In the meantime, the recognition results OUT are observed. According to the back-propagation training algorithm, the training and recognition controlling part 18 renews the weights w so as to reduce errors in the recognition results. This procedure is repeated until the errors become sufficiently small depending on the correctness and precision which are required. Repetition of the procedure may be about one hundred times for each of the reference patterns S(t).

During progress of the recognition phase of operation, each of the processed patterns P is still subjected to disturbances to a certain remaining extent. Such a pattern will be called a disturbed pattern. When supplied with the disturbed pattern from the adaptive input region 12, the pattern associator neural network 13 produces, besides the correct and precise output signal component, an erroneous output signal component with an appreciable level from each of at least one of the output cells that is not assigned with the correct category and is an erroneous cell other than the correct cell. The training and recognition controlling part 18 is therefore used in adjusting or training the input region 12 so as to make the input region 12 remove the disturbances from the segmented patterns used as the input patterns IN and to supply the processed patterns P to the neural network 13.

In the manner which will become clear as the description proceeds, the region cells of the adaptive input region 12 are subjected to resilient interconnection determined by several input region parameters so as to be displaceable to a certain extent of displacement. The afore-mentioned predetermined number is equal to the number of lattice points predetermined on an x-y plane on which each segmented pattern of the input patterns IN has pattern intensities. When supplied with the pattern intensities as region input signal components, the region cells deliver region output signal components to the respective input cells of the pattern associator neural network 13 as the input-layer input signal components. It should now be understood in connection with the illustrated example that the above-mentioned first number should be equal to the number of lattice points.

Figure 5:
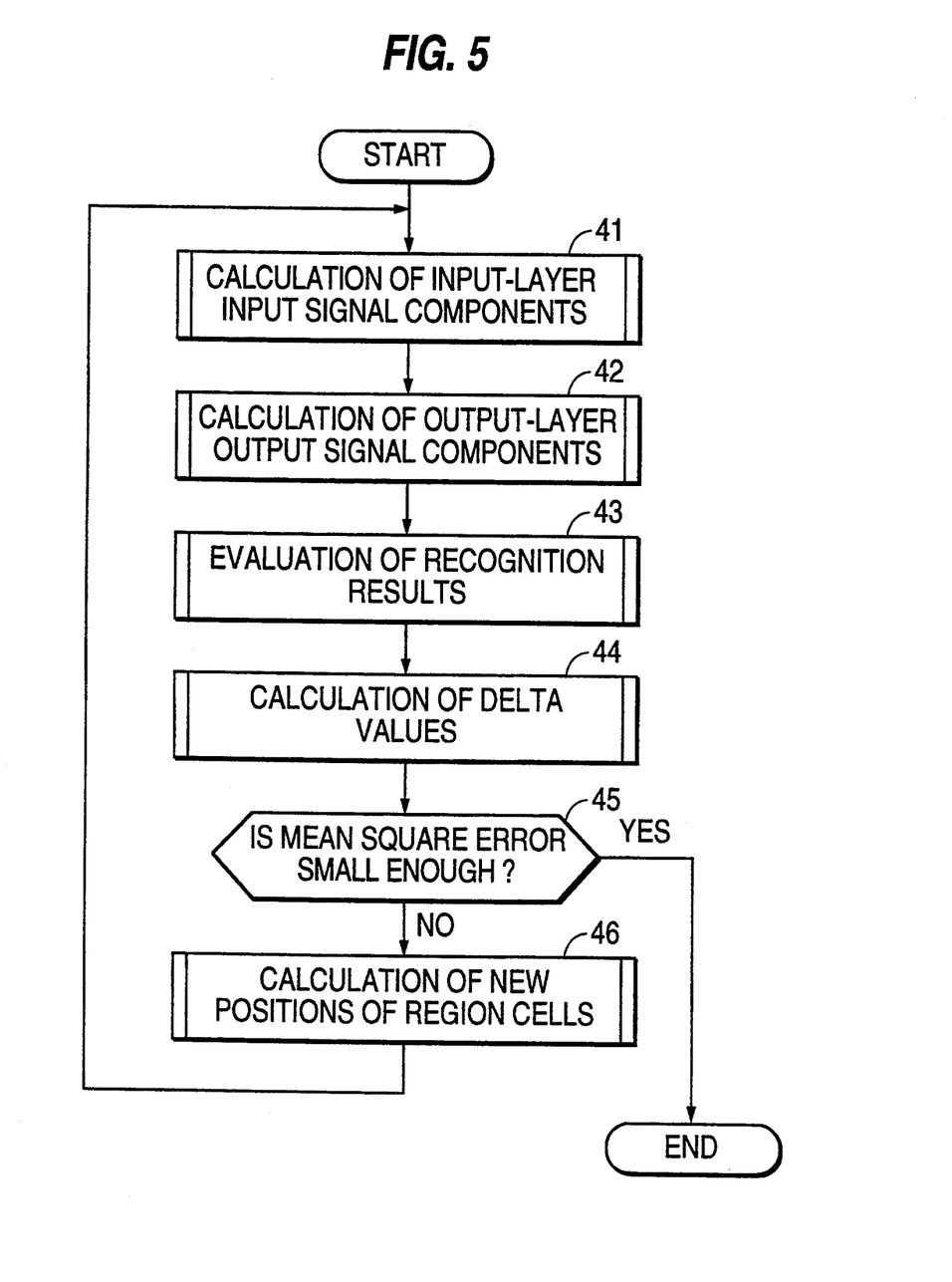
FIG. 5 is a flow chart for use in describing the steps of operation in the recognition phase mentioned in conjunction with FIG. 3.

Referring to FIG. 5 in addition to FIGS. 3 and 4, the recognition phase of operation will be described. It will be assumed that the pattern associator neural network 13 is already trained during the training phase of operation to correctly and precisely produce the recognition results OUT from the respective output cells in response to all the reference patterns S(t) and all the categories K(t) which are actually stored in the pattern and category memory region 11.

At a first step 41 of the recognition phase of operation, the adaptive input region 12 produces the region output signal components in response to each of the segmented patterns. It will be presumed that the j-th input cell is supplied, as the j-th input signal component net(j), with a pattern intensity I(x', y') which the segmented pattern in question has at a current point (x', y') displaced from a reference lattice point (0, 0) in the segmented pattern under consideration. As herein termed the reference lattice point is an arbitrary one of the lattice points predetermined in connection with the segmented pattern.

It is possible to calculate the pattern intensity at the current point in accordance with, for example:

$$I(x', y') = (1 - x')(1 - y')I(0, 0) + \\ x'(1 - y')I(1, 0) + \\ (1 - x')y'I(0, 1) + \\ x'y'I(1, 1), \quad (1)$$

I(0, 0), I(1, 0), I(0, 1), and I(1, 1) represent pattern intensities at the reference lattice point (0, 0) and three other lattice points (1, 0), (0, 1), and (1, 1) which are a unit distance spaced from the reference lattice point. In this manner, the input-layer input signal components are calculated by using the pattern intensities at such current points. Incidentally, it is sufficient that the region cells be used in one-to-one correspondence to the respective lattice points.

By using such pattern intensities related to the lattice points predetermined on the x-y plane, the output-layer output signal components of the neural network 13 are calculated at a second step 42. This is carried out by forward propagation of the pattern intensities through the neural network 13.

At a third step 43, the output signal components of the neural network 13 are used in evaluating the recognition result OUT. For this purpose, a correct cell and an erroneous cell are determined among the output cells with reference to the category which comprises the reference pattern or patterns coincident with the segmented pattern under consideration. It will be assumed that a k-th output cell is the correct cell and produces a k-th output signal component A(k). Other output cells produce other output signal components O(i). If produced with a maximum level, the k-th output signal component is a correct answer and is given a value of 1.0. Otherwise, the k-th output signal component is given another value of 0.0. Under the circumstances, the recognition result OUT has a mean square error E which is calculated according to:

$$E = (1/N)\left[\sum_{i=1}^{N} (A(k) - O(i))^2\right].$$

At a Fourth step 44, the back-propagation training algorithm is used in calculating a delta value which the j-th input cell has in the manner known in the art. The delta value is related to the mean square error as follows:

$$\delta(j) = -(\delta E)/(\delta net(j)), \quad (2)$$

where $\delta(j)$ represents the delta value of the j-th input cell. Equation (2) shows that the mean square error decreases when the j-th input signal component increases. As a result, the k-th output signal component approaches the correct answer to reduce the mean square error.

At a fifth step 45, the mean square error E is checked as to whether or not it is small enough to achieve the desired degree of correctness and precision of pattern recognition. In an affirmative case, the recognition phase of operation comes to an end. If the check shows a negative result, the fifth step 45 proceeds to a sixth step 46.

At the sixth step 46, the region cells of the adaptive input region 12 are displaced to new positions so as to give an increase to the j-th input signal component. The increment is determined in compliance with:

$$\Delta(j) = \eta \delta(j),$$

where $\Delta(j)$ represents the increment and $\eta$ represents a constant which is selected between 0 and 1, both exclusive, in the manner known in the back-propagation training algorithm.

In order to displace the region cells to the new positions, the region cells are subjected to a delta force as termed herein. In the meantime, the region cells are given an address force as termed herein. The address force is used so as to prevent the region cells from moving in disorder. Those of the region cells which deliver j-th and m-th region output signal components to the j-th and an m-th input cell of the neural network 13 will be called j-th and m-th region cells.

Figure 6:
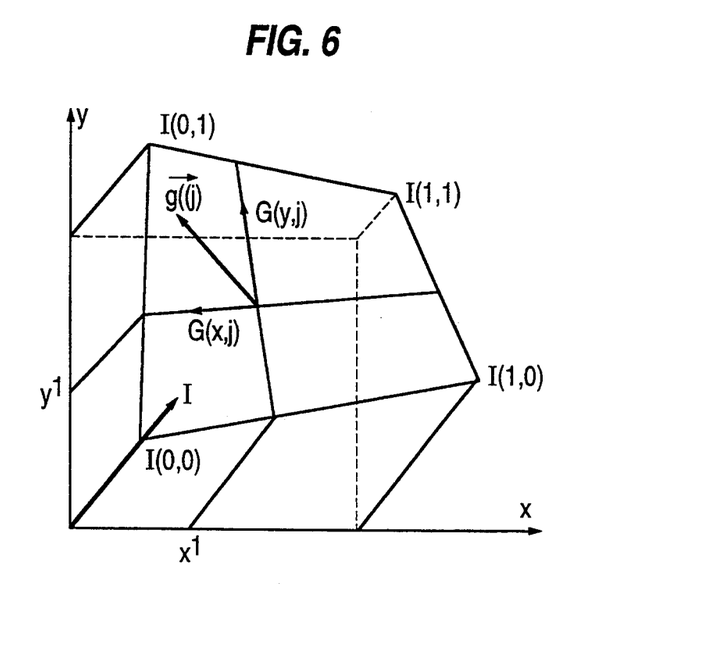
FIG. 6 schematically shows a hexahedron for use in describing one of the steps illustrated in FIG. 5.

Turning to FIG. 6 for a short time an intensity surface is depicted over the x-y plane. An arbitrary point (x, y) is used on the x-y plane. In the manner described in conjunction with Equation (1) the pattern intensities are I(0, 0), I(1, 0), I(0, 1), and I(1, 1) at the lattice points (0, 0), (1, 0), (0, 1), and (1, 1). It will be assumed that the pattern intensity varies linearly along the intensity surface. In this event, the intensity surface becomes an intensity plane. The pattern intensity has a gradient vector g(x, y) on the intensity plane at the arbitrary point (x, y). It should be noted that the gradient vector is denoted by an ordinary letter rather than either by a bold letter or by an arrow over the ordinary letter.

In the manner described before, the j-th region cell produces the j-th region output signal component representative of the pattern intensity I(x',y') having a j-th gradient vector g(j) which has j-th x-axis and y-axis vector components G(x, j) and G(y, j) and is given by:

$$g(j) = G(x, j)x + G(y, j)y.$$

where x and y represent unit vectors along the x and the y axes of the x-y plane and are again denoted by ordinary letters. The vector components are calculated as follows.

$$G(x, j) = (\partial I)/(\partial x) \\ = y'[I(1, 1) - I(0, 1)] + \\ (1 - y')[I(1, 0) - I(0, 0)]$$

and $$G(y, j) = (\partial I)/(\partial y) \\ = x'[I(1, 1) - I(1, 0)] + \\ (1 - x')[I(0, 1) - I(0, 0)].$$

In connection with the j-th input signal component net(j) or the j-th region output signal component, the delta force will be called a j-th component vector and denoted by an ordinary letter n(j). Preferably, the j-th component vector is calculated in accordance with:

$$n(j)=\eta\delta(j)[|g(j)|/(1-|g(j)|^2]\times[1/|g(j)|]g(j),\qquad 5$$

where |g(j)| represents the absolute value of the j-th gradient vector.

As regards only the j-th and the m-th region cells, the address force will be called a (j,m)-th component vector and denoted by an ordinary letter f(j, m). By using a resiliency parameter K as one of the afore-mentioned input region parameters that defines the resiliency of the resilient interconnection among the region cells of the input region 12 and may be equal to 1.0, the (j, m)-th component vector is calculated according to:

$$f(j,m)=K[|jm|-L(j,m)][1/|jm|]jm,$$

where jm represents by a combination of ordinary letters a position vector starting at the j-th region cell and ending at the m-th region cell and L(j, m) represents a natural distance between the j-th and the m-th region cells. The j-th region cell 1s therefore subjected to a j-th total component vector F(j) which is again denoted by an ordinary letter and is given by:

$$F(j)=\Sigma f(j,m).$$

Turning back to FIG. 5, the new positions are determined at the sixth step 46 in consideration of the j-th component vector and the j-th total component vector. It will be assumed that the j-th region cell is given a j-th new displacement to displace to a j-th new position from a j-th old position to which the j-th region cell is displaced by a j-th old displacement having an initial value equal to zero. By using an ordinary letter, the j-th new and old positions are represented by position vectors p(j, new) and p(x, old) and the j-th new and old displacements, by Δp(j, new) and Δp(j, old). Under the circumstances, the j-th new position and the j-th new displacement are calculated in compliance with:

$$p(j,\text{ new}) = p(j,\text{ old}) + \Delta p(j,\text{ new})$$
and
$$\Delta p(j,\text{ new}) = \alpha(1)\Delta p(j,\text{ old}) + \alpha(2)n(j) + \alpha(3)F(j),\qquad 45$$

where α(1) to α(3) are first through third parameters of the input region parameters and may be equal to 0.5, 0.2, and 4.0. The first parameter represents a kind of inertia, by which it is possible to adapt the input region 12 to successive segmented patterns beyond a local minimum. When a smaller value is selected as the resiliency parameter K, it is possible to cope with the scale change of a wider range.

Going back to the first step 41, the j-th new position is newly used as the current point of the j-th region cell in calculating the input-layer input signal components of the respective input cells. The first through the sixth steps 41 to 46 are cyclically repeated until each segmented pattern becomes identical with a pertinent one of the reference patterns S(t), when the mean square error E becomes sufficiently small at the fifth step 45. Cyclic repetition of about one hundred times will reduce the mean square error to a small enough amount for each segmented pattern.

It will now be easily possible to implement the training and recognition controlling part 18 by those skilled in the arts of back-propagation training the pattern associator neural network 13 and software design.

What is claimed is:

1. A neural network assembly, comprising:
   a memory region for storing reference patterns and categories of said reference patterns;
   an adaptive input region, having region cells, for adaptively processing input patterns having disturbances into processed patterns with said disturbances removed, said adaptive input region being trainable to remove said disturbances by adjustment of said region cells of said adaptive input region by resilient interconnection;
   a pattern associator neural network, selectively coupled to said memory region and said adaptive input region, for recognizing patterns in said processed patterns corresponding to said reference patterns and for producing a recognition result representative of at least one of said categories;.
   a training and recognition controlling unit, coupled to said memory region and said pattern associator neural network, for training said pattern associator neural network to correctly produce said recognition result and coupled to said adaptive input region for training said adaptive input region to remove said disturbances by said adjustment of said region cells by resilient interconnection;
   wherein said training and recognition controlling unit provides a training phase of operation and a recognition phase of operation of said pattern associator neural network, said recognition phase following said training phase; and
   further comprising a switching network for coupling said pattern associator neural network to said memory region during said training phase and for coupling said pattern associator neural network to said adaptive input region during said recognition phase.

2. A neural network assembly, comprising:
   a memory region for storing reference patterns and categories of said reference patterns;
   an adaptive input region, having region cells, for adaptively processing input patterns having disturbances into processed patterns with said disturbances removed, said adaptive input region being trainable to remove said disturbances by adjustment of said region cells of said adaptive input region by resilient interconnection;
   a pattern associator neural network, selectively coupled to said memory region and said adaptive input region, for recognizing patterns in said processed patterns corresponding to said reference patterns and for producing a recognition result representative of at least one of said categories;
   a training and recognition controlling unit, coupled to said memory region and said pattern associator neural network, for training said pattern associator neural network to correctly produce said recognition result and coupled to said adaptive input region for training said adaptive input region to remove said disturbances by said adjustment of said region cells by resilient interconnection; and
   a switching network, controlled by said controlling unit, for coupling said memory region to said pattern associator neural network for enabling said controlling unit during a training phase to train said pattern associator neural network by using said reference patterns and said categories from said memory region, and for coupling said adaptive input region to said pattern associator neural network for enabling said controlling unit during a recognition phase to train said adaptive input region.

3. A neural network assembly comprising:

a memory region for memorizing reference patterns and categories of said reference patterns;

an adaptive input region for adaptively processing input patterns having disturbances into processed patterns with said disturbances removed, said adaptive input region having a plurality of region cells bound together with resilient connections in accordance with an address force and being trainable to remove said disturbances by adjustment of said resilient connections;

a pattern associator neural network, selectively coupled to said memory region and said adaptive input region, for recognizing patterns in said processed patterns corresponding to said reference patterns and for producing a recognition result representative of at least one of said categories;

a training and recognition controlling unit, coupled to said memory region and said pattern associator neural network, for training said pattern associator neural network to correctly produce said recognition result and coupled to said adaptive input region for providing a delta force input for training said adaptive input region to remove said disturbances by said adjustment of said resilient connections of said region cells; and a switching network, controlled by said controlling unit, for coupling said memory region to said pattern associator neural network for enabling said controlling unit during a training phase of operation to train said pattern associator neural network by using said reference patterns and said categories from said memory region, and for coupling said adaptive input region to said pattern associator neural network for enabling said controlling unit during a recognition phase of operation to train said adaptive input region.

4. A neural network assembly, as in claim 3, wherein said training and recognition controlling unit provides said training phase of operation and said recognition phase of operation of said pattern associator neural network, said recognition phase following said training phase.

* * * * *